United States Patent
Tong

(10) Patent No.: US 11,429,893 B1
(45) Date of Patent: Aug. 30, 2022

(54) MASSIVELY PARALLEL REAL-TIME DATABASE-INTEGRATED MACHINE LEARNING INFERENCE ENGINE

(71) Applicant: Amazon Technologies, Inc., Seattle, WA (US)

(72) Inventor: Dylan Tong, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 961 days.

(21) Appl. No.: 16/189,205

(22) Filed: Nov. 13, 2018

(51) Int. Cl.
*G06N 20/00* (2019.01)
*G06N 5/04* (2006.01)

(52) U.S. Cl.
CPC ............... *G06N 20/00* (2019.01); *G06N 5/04* (2013.01)

(58) Field of Classification Search
CPC ........ G06N 20/00; G06N 5/04; G06F 16/953; G06F 16/24542
See application file for complete search history.

(56) References Cited

U.S. PATENT DOCUMENTS

| | | | |
|---|---|---|---|
| 2016/0034530 A1* | 2/2016 | Nguyen | G06F 16/2471 707/719 |
| 2017/0193371 A1* | 7/2017 | Shen | G06N 20/00 |
| 2018/0314735 A1* | 11/2018 | Liu | G06F 16/217 |
| 2019/0361999 A1* | 11/2019 | Oks | G06F 16/2465 |
| 2020/0110843 A1* | 4/2020 | Dunjic | G06F 16/24575 |

OTHER PUBLICATIONS

Wang, "Rafiki: Machine Learning as an Analytics Service System", Apr. 2018. (Year: 2018).*
"Machine Learning Warehouse," Kinetica, downloaded Nov. 13, 2018, https://www.kinetica.com/products/machine-learning/, 10 pages.
Campbell, Ben, "How Does a GPU Database Play in Your Machine Learning Stack?", May 12, 2017, Kinetica Blog, downloaded Nov. 13, 2018, https://www.kinetica.com/blog/gpu-database-in-machine-learning-stack/, 7 pages.
"Introduction to BigQuery ML," Google Cloud, downloaded Nov. 13, 2018, https://cloud.google.com/bigquery/docs/bigqueryml-intro, 4 pages.
"Getting Started with BigQuery ML for Data Scientists," Google Cloud, downloaded Nov. 13, 2018, https://cloud.google.com/bigquery/docs/bigqueryml-scientist-start, 15 pages.
"Getting Started with BigQuery ML for Data Analysts," Google Cloud, downloaded Nov. 13, 2018, https://cloud.google.com/bigquery/docs/bigqueryml-analyst-start, 16 pages.

* cited by examiner

*Primary Examiner* — Dave Misir
(74) *Attorney, Agent, or Firm* — Nicholson De Vos Webster & Elliott LLP

(57) ABSTRACT

Techniques for massively-parallel real-time database-integrated machine learning (ML) inference are described. An ML model is deployed as one or more model serving units behind an endpoint. The ML model can be associated with a virtual table or function, and a query that is received that references the virtual table or function can be processed by issuing inference requests to the endpoint by the query execution engine(s).

20 Claims, 9 Drawing Sheets

MASSIVELY PARALLEL REAL-TIME DATABASE-INTEGRATED MACHINE LEARNING INFERENCE ENGINE

BACKGROUND

Standard databases are used in a wide variety of contexts and a large number of applications have been developed to allow users to easily store data in databases, query this data to obtain descriptive information, etc. For example, many business intelligence (BI) applications exist that allow business users to analyze business information stored in databases using various graphical user interfaces and other tools.

However, one business need that is not well addressed by existing BI applications involves predicting future events, determining the odds of future events occurring, inferring characteristics about users or products, etc. As a few examples, with BI applications it is difficult to accurately determine what will a customer buy next based on history of transactions, what are the odds that a current customer of a service will leave in the near future, what are the preferences of a customer based on products that they have purchased or browsed, etc., as simple statistical techniques provided by databases are not well-suited for these tasks, and the BI applications cannot easily access the large amount of data from an underlying database to efficiently create up-to-date and accurate projections. Instead, these types of analysis are commonly done using machine learning (ML) techniques, which utilize specialized ML models that are constructed by advanced users (such as data scientists).

Accordingly, there is a significant disconnect—business users may use BI tools that run on top of databases, but they want to ask advanced questions that require ML techniques. However, to implement ML analysis, data scientists with advanced degrees are needed to help these business users get the answers they desire.

BRIEF DESCRIPTION OF DRAWINGS

Various embodiments in accordance with the present disclosure will be described with reference to the drawings, in which.

DETAILED DESCRIPTION

Figure 1:
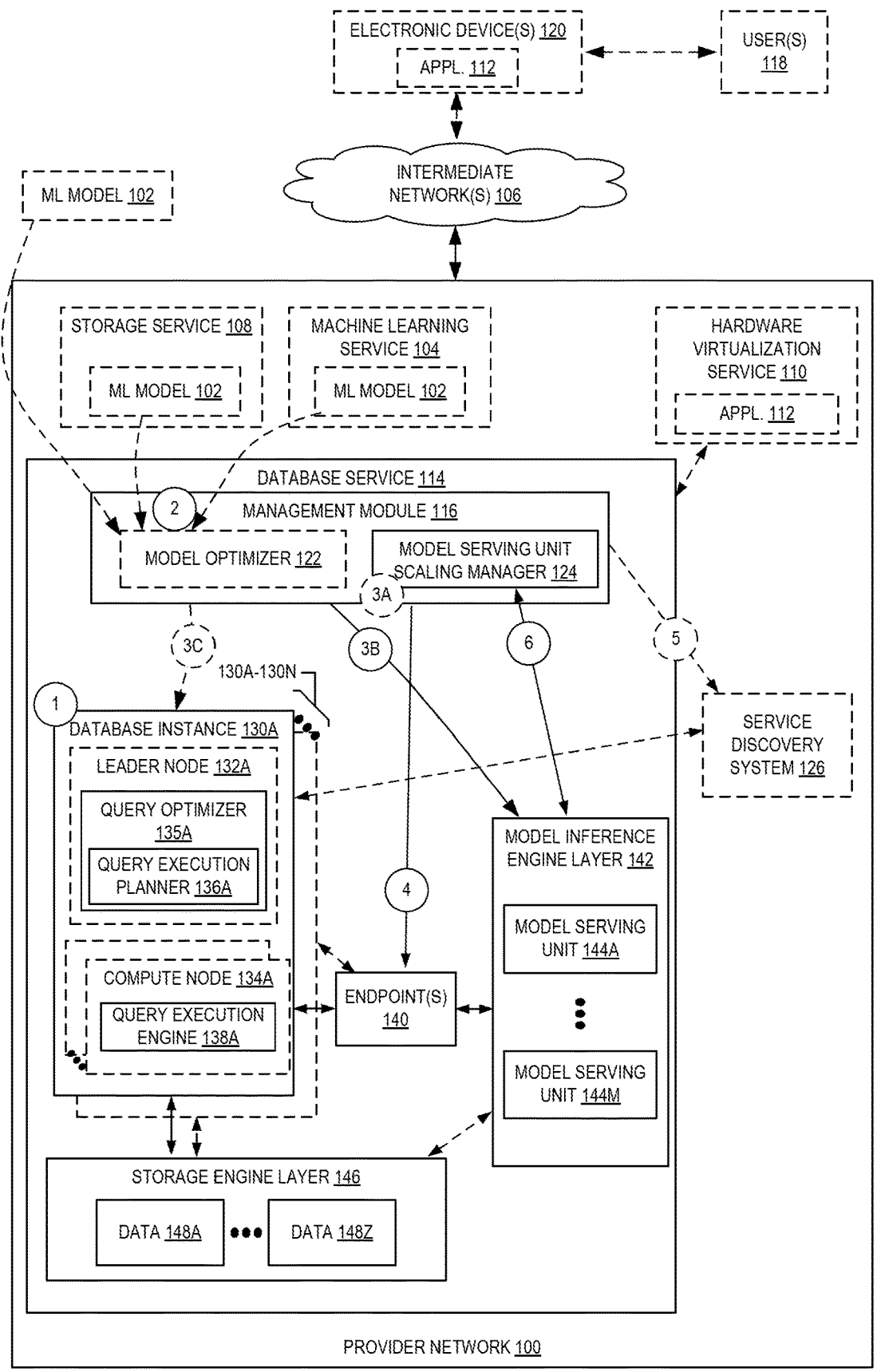
FIG. 1 is a diagram illustrating an environment for configuring massively parallel real-time database-integrated machine learning inference according to some embodiments.

Various embodiments of methods, apparatus, systems, and non-transitory computer-readable storage media for massively parallel real-time database-integrated machine learning inference are described. Embodiments disclosed herein provide a massively parallel real-time inference database engine that can be used with cloud-based databases (or other large-scale computing environments) and provide the ability to allow users to use standard query interfaces to query ML models to answer predictive type questions. Embodiments, support real-time inference using data of a database, allow users to use existing business intelligence (BI) software without modification, reduce the friction involved to test and deploy new ML models via an open architecture that is loosely-coupled with the underlying database, and allow software developers to easily add ML capabilities via using comfortable, well-known and understood pathways (e.g., standard Structured Query Language (SQL) or similar queries).

As introduced in the background, accessing database data requires separate interfaces and accesses from ML models. For example, business users may use a graphical user interface (GUI) based dashboard to explore data, but if they require advanced reporting based on ML inference, these users must solicit a data science team to create custom models and create a new dashboard display module for the business users to access. Obviously, this is slow process, and does not leverage existing BI tools.

Alternatively, users could do batch inference—e.g., using a large amount of data points, run inference on it, and then persist the results in the database, which could allow business users to query against these results. However, a problem with this approach is that the questions to be answered must be known ahead of time—and thus, it is a requirement to know what ML model needs to be used, what data will need to be examined, etc., which often is not the case in the real world, as users often develop additional or alternative questions as they begin to explore the data. Additionally, this develop-and-integrate approach also fundamentally introduces a delay and thus staleness in the data, as it takes a lot of time from the time of data acquisition, inference generation, and reporting. This is especially problematic for analytics, which requires near real-time exploration of data.

As another alternative, an additional inference type capability could be provided to such users through some new database function—e.g., a linear regression function, a random cut function, etc. However, in these cases, the scope of the models is very restricted, as vendors have to pick certain models that will be supported, which thus constrains this approach to only working with a limited set of models that a vendor provides. Further, these ML models tend to be very simple, as vendors need these models to be generic enough to work for lots of different users. Moreover, as pre-trained models are based on generic data, these models may not work well for specific use cases. Additionally, there is no way to easily allow a customer to be able to train these models through SQL type calls or other database interfaces, etc., and there are other special tools that exist for ML training and configuration that are far better.

As indicated herein, embodiments improve on these approaches via a massively parallel real-time inference database engine that can integrated with cloud-based databases (or other large-scale computing environments) to allow users to use standard query interfaces to query ML models to answer predictive type questions. Embodiments thus ultimately enable the ability for users to query their own data warehouse or data lake through a database engine and directly obtain predictive query results. For instance, a standard database engine that stores customer transactions can answer questions about how much a customer has spent to date, and what products have they bought, but predictive questions such as whether a customer is going to spend money again, or what are the most likely products they're going to buy next are questions that are better served by ML models. The ability to embed the use of ML models within the database engine provides the benefit of allowing users to gain the ability to perform inferential analysis through existing tools (e.g., querying tools, business intelligence tools, etc.).

FIG. 1 is a diagram illustrating an environment for configuring massively parallel real-time database-integrated machine learning inference according to some embodiments. FIG. 1 shows a database service 114 including a model inference engine layer 142 coupled with one or more database instances 130A-130N to provide inference capabilities.

The database service 114 may be implemented within a provider network 100. A provider network 100 provides users 118 with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service 110 that can execute compute instances, a storage service 108 that can store data objects, etc. The users 118 (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user 118 may directly utilize a compute instance hosted by the provider network to perform a variety of computing tasks, or may indirectly utilize a compute instance by submitting code to be executed by the provider network 100, which in turn utilizes a compute instance to execute the code (typically without the user having any control of or knowledge of the underlying compute instance(s) involved).

A database service 114 may be one such service provided by a provider network 100, which may allow users 118 (via applications 112 executing at client electronic devices 120 or by a hardware virtualization service 110, serverless execution service, container execution service, etc.) to store and/or query against data in a database. The database may be of a variety of types—such as relational databases, NoSQL databases, data warehouses, object databases, NewSQL databases, etc.—and architectures—e.g., single instance, distributed, etc. In the example of FIG. 1, the database service 114 provides a distributed database where a user 118 can implement one or more database instances 130A-130N. For example, at circle (1), a user 118 may send one or more requests (e.g., via an electronic device 120 providing a console application to the user 118) to the provider network 100 to implement one or more one or more database instances 130A-130N. This may include uploading (or otherwise populating) data 148 for the database, configuring rules/controls for accessing the database, etc.

Each database instance 130 could include a cluster of nodes (each of which may correspond or be implemented by a virtual machine or physical host); for example, database instance 130A is shown as possibly including a leader node 132A and one or more compute nodes 134A. A leader node 132A receives queries from client applications 112, where a query optimizer 135A parses the queries and develops query execution plans (e.g., via a query execution planner 136A of the query optimizer 135A). The leader node 132A then coordinates the parallel execution of these plans with the compute nodes 134A-134Z and aggregates the intermediate results from these nodes. The leader node 132A then returns the results back to the client applications 112. Compute nodes 134A-134Z execute the query execution plans (via a corresponding query execution engine 138A-138Z) against the data 148A-148Z of a storage engine layer 146, which may include transmitting data among themselves, to serve these queries. In some embodiments, each node 134 may be located on a same physical device or otherwise "directly" coupled with a corresponding amount of data 148A (e.g., a particular subset of the overall data). The intermediate results are sent to the leader node 132A, which coalesces the query results that have been computed by the compute nodes, and streams the coalesced results back to the client applications 112. The type and number of compute nodes utilized may depend on the size/type of the data 148, the number of queries executed or to be executed, the query execution performance that is desired, etc., and may be configured by the user 118, set by the database service 114, and/or scaled (changed) over time either automatically or on-demand. However, other embodiments use different architectures for query processing, and thus this example is illustrative and not meant to be limiting.

At circle (2), the user 118 may cause a ML model 102 to be provided to the database service 114. For example, the user 118 may provide an identifier of a ML model 102 or storage location holding the ML model 102 within a storage service 108 (or possibly at another location outside the provider network 100, such as another server or another provider network). A management module 116 (e.g., software executed by one or more computing devices) of the database service 114 may then use this information to retrieve (e.g., download) the ML model 102 from the storage service 108.

As another example, the user 118 may train a ML model 102 via a machine learning service 104 of the provider network 100. The machine learning service 104 may provide the ML model 102 directly to the management module 116 upon a completion of training (or upon a user request) or store the model 102 in a storage service 108 location from which the management module 116 can obtain the model 102 as indicated above.

As yet another example, the user 118 may "directly" provide the ML model 102, e.g., via uploading the ML model (e.g., a compressed file or other "package" carrying one or more files of the ML model 102) to the database service 114.

As part of circle (2), the user 118 may also (via an electronic device 120, service, or other application) provide a set of metadata associated with the ML model 102 for use in running, deploying, and/or managing the use of the ML model 102. For example, the metadata might describe the ML model 102 itself, such as the inputs, outputs, data types, basic instructions used by the model, etc., which can be used to configure how the ML model 102 is deployed. Additionally, or alternatively, the metadata may specify other attributes such as how the ML model 102 is to be implemented or scaled (e.g., an initial number of model serving units 144 to be deployed for the ML model 102, a maximum and/or minimum number of model serving units 144 to be deployed for the ML model 102 at any point in time due to auto-scaling of the number of model serving units according to actual or expected demands), an expected amount of use of the ML model 102, etc., allowing the database service 114 to properly manage the running ML model 102 (in the form of one or more model serving units 144) for execution to satisfy the user's needs.

The ML model 102 may be trained using a variety of frameworks (e.g., TensorFlow, MXNet) and in any of a variety of known formats. Upon being obtained by the management module 116, a model optimizer 122 component can process (or "optimize") the ML model into an optimized format, e.g., to improve the performance of the model to thus reduce inference latency and improve overall system throughput. A variety of optimizations can be implemented using techniques known to those of skill in the art; for example, network pruning and consolidation algorithms for deep neural networks can be applied to simplify and create a more efficient model, which could even be further optimized for specific ML inference hardware that will be utilized. Although the optimization is not performed in some embodiments, in other embodiments the optimization of the ML model can significantly improve the overall performance of the system.

Optionally, at circle (3A), the ML model 102 may be provided to a model serving unit scaling manager 124 (e.g., a software module) that includes logic to analyze the ML model 102, underlying data 148, user preferences, etc., to determine a number of model serving units 144A-144M to initially deploy as part of a model inference engine layer 142. A model serving unit 144 may include an application that can be deployed to "run" the ML model 102 and thus perform inferences by receiving inference requests, using input data from the inferences requests with the ML model, and returning inference results. By way of example, a model serving unit 144 may comprise an application deployed in a container or VM to a computing device. However, in alternate embodiments, a set of "default" rules or heuristics can be used to determine a number of model serving units 144A-144M to initially deploy—e.g., always deploy exactly one, deploy a number commensurate with (or otherwise based on) the number of compute nodes 134 of the associated database instance 130A, etc. Additionally, or alternatively, the model serving unit scaling manager 124 may use the user-provided metadata to select an initial number of model serving units 144A-144M—e.g., the user may specify a particular number, an expected use amount, etc., guiding the model serving unit scaling manager 124 to select an appropriate amount. The model serving unit scaling manager 124 may additionally or alternatively select a number of model serving units 144A-144M to deploy based on a data profile of the data 148 of the database (e.g., indicating how distributed the data is, the amounts of data involved, the type of data involved, etc.), expected user or query usage for the database, computing resource capabilities of the database instance (e.g., an amount of memory, processing capabilities, network bandwidth, number of virtual or physical machines implementing the database instance), etc.

For example, the model serving unit scaling manager 124 may perform proactive, synthetic experiments (e.g., via queries or other calls not issued by an end user, but the manager itself). These experiments may run standardized benchmarks or top user queries identified from historic activity of the database, and can be run as background maintenance processes, or as part of the model provisioning process. These experiments can test and discover optimal internal configurations such as the batch size of records the storage or compute nodes should send to a model serving unit to achieve the overall best throughput and latency, and/or what is the throughput (e.g., number of inferences per second) that a single model serving unit can deliver so that the model serving unit scaling manager 124 knows how to effectively scale the system to adapt to changes in demand on the databases. As each ML model may have different characteristics due to the ML model's architecture, or the framework it is running on, such proactive tests allow the model serving unit scaling manager 124 to intelligently auto-scale in an efficient way at the granularity of each unique model served by the system.

At circle (3B), the management module 116 may then deploy the particular number of model serving units 144A-144M (e.g., as a microservice), where each of the model serving units 144A-144M may include code and/or data enabling it to "run" the ML model 102. The deployment may include calling another service—e.g., a hardware virtualization service 110, etc.—to place the model serving units 144A-144M. The model inference engine layer 142 may comprise a set of computing resources (e.g., a number of physical server computing devices) that run model serving units 144A-144M for multiple users 118. This model inference engine layer 142 is invisible to users of the database service 114, as it may be a fully managed multi-tenant layer. Thus, users need not know what architecture looks like, and the provider network 100 implementor may use special purpose hardware and/or software components optimized for model inference, e.g., via use of server computing devices having GPUs or machine learning accelerators, special software/drivers, etc.

The management module 116 may then register the model, which may include at optional circle (3C) notifying the database instance 130A of the existence of the ML model and data that can be used to identify when it needs to be invoked (e.g., a particular table name), and/or configuring, at circle (4), one or more endpoints 140 (e.g., network addresses or hostnames associated with those model serving units 144A-144M that can receive traffic and provide the traffic to the model serving units 144A-144M) and at optional circle (5) sending an identifier of the endpoint 140 (e.g., a hostname and/or network address, etc.) and/or an identifier of the corresponding ML model or database instance to a service discovery system 126. The service discovery system 126 may comprise a software module that stores mappings allowing for the one or more database instances 130A-130N (and potentially other entities of the provider network 100) to identify locations (e.g., hostnames, IP addresses) of particular entities within the provider network 100.

At this point, the database service 114 is enabled to process queries and utilize the ML model via the model inference layer 142. As this occurs, the model serving unit scaling manager 124 may monitor the one or more database instances 130A-130N, storage engine layer 146, model inference engine layer 142, etc., to scale up or down a number of model serving units 144A-144M associated with a particular ML model at circle (6). For example, the model serving unit scaling manager 124 may obtain database activity information (e.g., a record of the types and/or numbers of queries submitted to the database instance 130A), database profiling information (e.g., descriptions of the data 148A-148Z of the database, such as its cardinality, number of records), database instance information (e.g., how large a cluster of compute nodes 134 is), and/or any provided scaling-related metadata from the user to determine whether any model serving units are to be scaled up or down.

In some embodiments, the management module 116 may also run experiments regarding how to call the model serving units 144A-144M. As there may be some dependencies on how ML models are constructed, the management module 116 may explore the performance of the model serving units 144A-144M by sending different amounts of traffic (e.g., one record at a time, ten at a time, one-hundred at a time, etc.) to determine the scaling performance characteristics/statistics of the model serving units 144A-144M. Thus, using these statistics, the query optimizer 135A can generate plans on how to execute a query the most efficiently by having the compute nodes 134 send different amounts of data in inference requests based on what is most performant.

Figure 2:
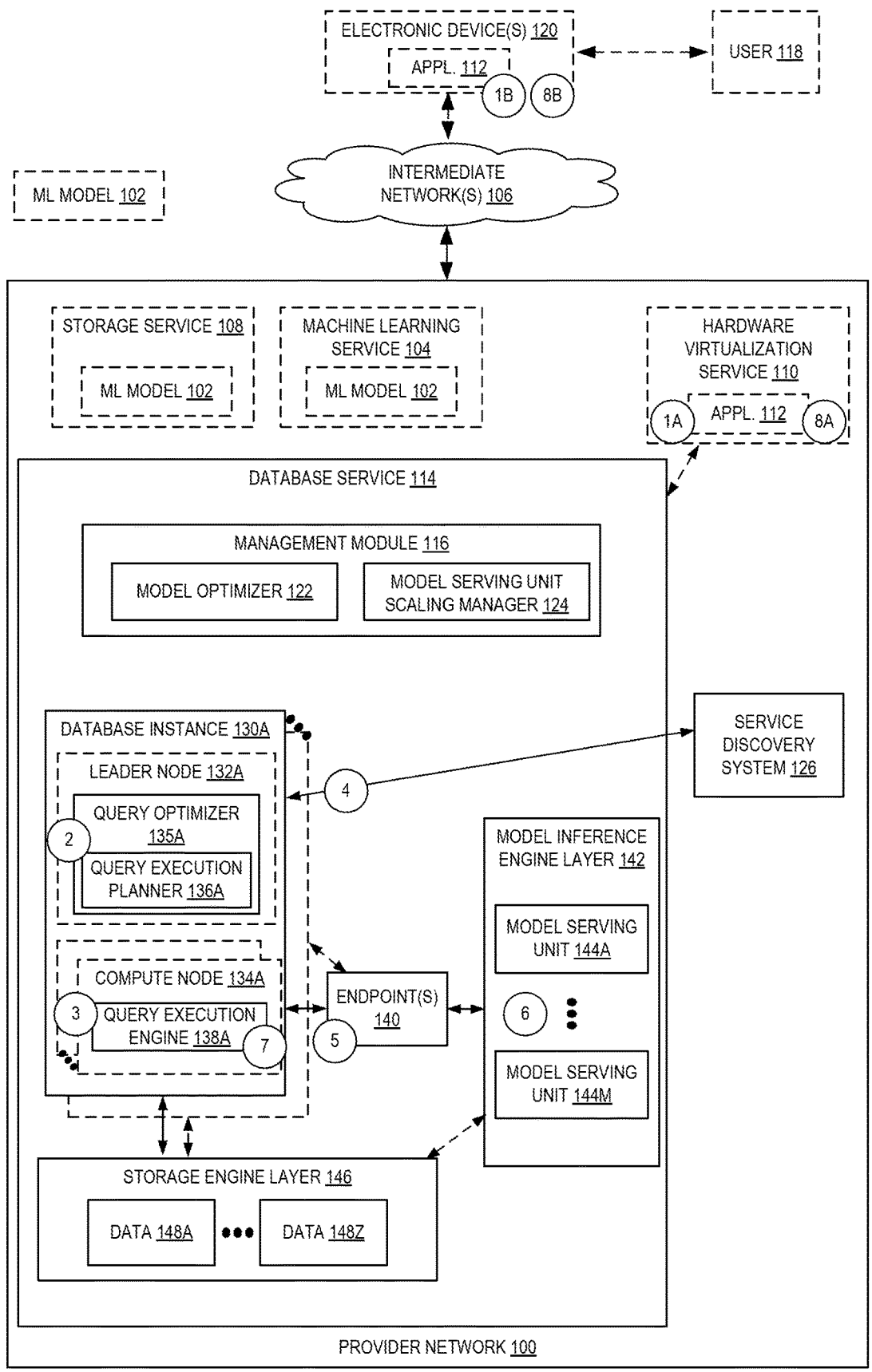
FIG. 2 is a diagram illustrating an environment for performing massively parallel real-time database-integrated machine learning inference according to some embodiments.

For further detail on how to process queries and utilize the ML model, FIG. 2 is a diagram illustrating an environment for performing massively parallel real-time database-integrated machine learning inference according to some embodiments. As shown at circle (1A) or (1B) a query may be constructed and transmitted by an application 112. The query may be adherent to a standard (e.g., a standard form of SQL), which allows for the system to be easily utilized by legacy systems, existing applications, users who are already familiar with a query language, etc. The query may include certain aspects that cause the query to utilize the ML model. For example, the use of a particular table name, attribute name, function name, etc., may be associated with the model as described subsequently herein.

The query is sent to the database instance 130A and operated upon by a query optimizer 135A at circle (2). The query optimizer 135A may be augmented to recognize and support query semantics for ML model inference. Thus, the query optimizer 135A can provide model inference steps as a part of the query execution plan(s) provided to the query execution engine(s) 138A-138Z at circle (3).

For example, in some embodiments the query optimizer 135A can identify points in the plan where inference is to be performed and push down model inference endpoint 140 information (e.g., a hostname or network address) to the compute nodes to give them the ability to communicate with the model inference engine layer 142 and, e.g., ultimately stream data to appropriate model serving endpoints in parallel. Thus, in some cases the compute nodes 134 may need to query, at circle (4), the service discovery system 126 to identify reachability information (e.g., endpoint 140 information) for a particular ML model, which then can be used to issue inference requests at circle (5) to the endpoint(s) 140 which thus are provided to ones of the model serving units 144A-144M at circle (6) to perform inference. The inference results (or outputs) generated by the ML model are sent back to the respective calling compute node 134, which may process the results at circle (7), pass the relevant results back to the leader node 132, which sends back a final result to the application 112 at circle (8A) or (8B). In this manner, a single query may infer results from one ML model, though it is also possible for a single query to infer results from multiple ML models. For example, a single query may query multiple virtual tables, and thus, run inference against multiple ML models to blend the results (e.g., via table joins) together to answer the query.

As an example, in a streaming scenario, each storage node (or "slice", in some architectures) will stream input data to the allocated model serving endpoint 140. Each model serving unit 144 will stream the output back to appropriate compute node 134 in parallel. Note that in some embodiments the ML models (implemented by the model serving units 144) may expect non-tabular data as input—for instance, a recurrent neural network (RNN) may expect rows of arrays/vectors as input. Thus, in some embodiments the database provides the support for the necessary data types, and data of the appropriate input format can be streamed to the model inference engine layer 142.

A variety of types of APIs can be implemented between the compute nodes 134 and the model serving units 144A-144M. For example, an API call with an "invoke" method can be used along with the input for the inference—e.g., tabular data, lists, arrays, etc.

Figure 3:
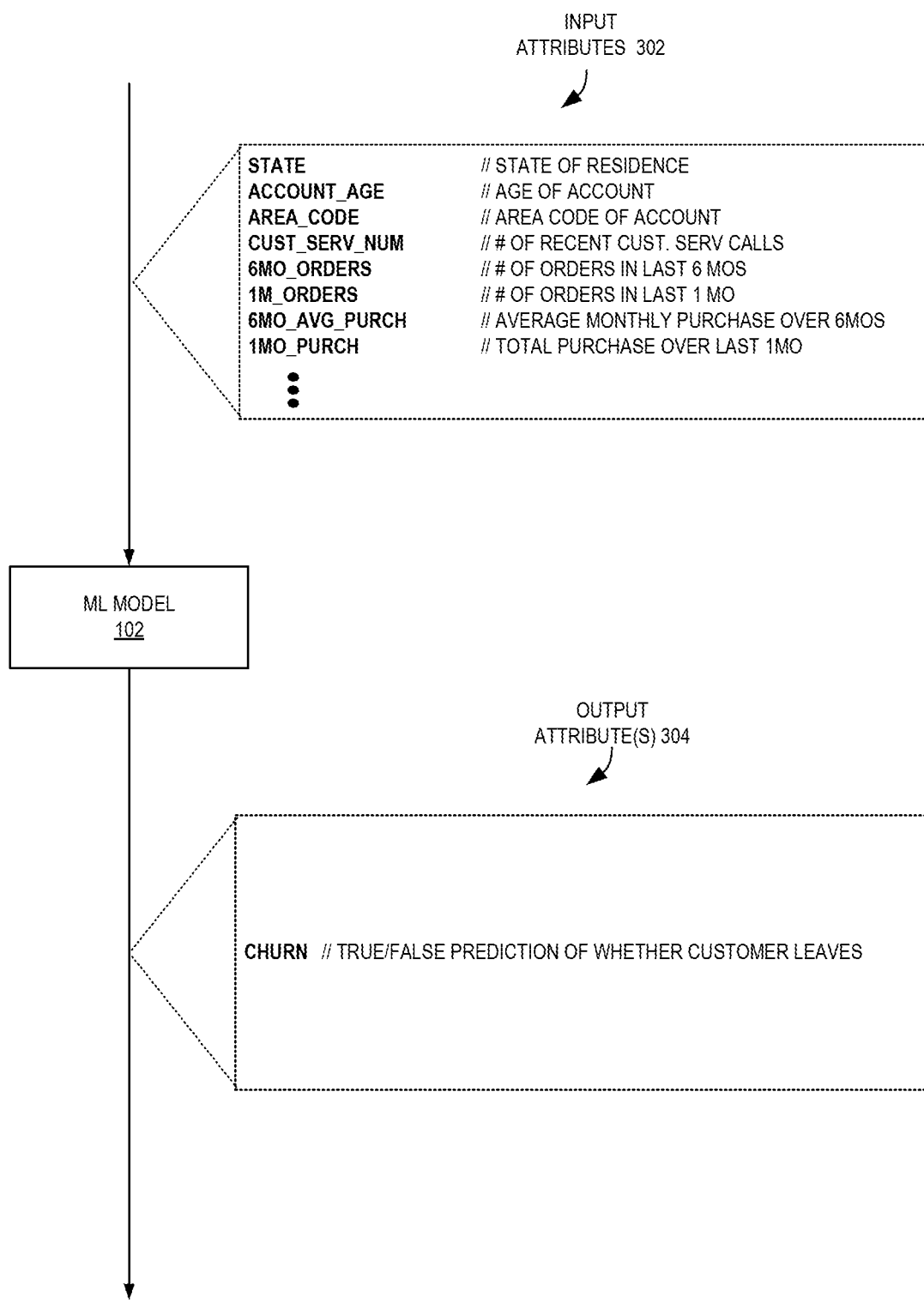
FIG. 3 is a diagram illustrating exemplary input arguments and an output inference from a machine learning model according to some embodiments.

For detail, we start with FIG. 3, which is a diagram illustrating exemplary input arguments and an output inference from a machine learning model according to some embodiments. In this case, we assume that the ML model 120 could be a "churn" model that predicts a likelihood that a particular user will leave some service. The input attributes 302 may include a number of different values, such as what state the user resides in, an age of the customer's account, an area code of the user, etc. The output 304 may include an inferred value—here, a binary value (or "True/False") prediction of whether the customer will leave in a next period. Of course, many different types of input attributes, output values, and ML models may be utilized.

When this ML model 120 is inputted to the database service 114, additional information may also be provided by the user. For instance, a ML model may be provided along with a file (or other type of input data format) that describes the input and output attributes of the model, which in turn allows the system to create the appropriate database objects to support the model.

Figure 4:
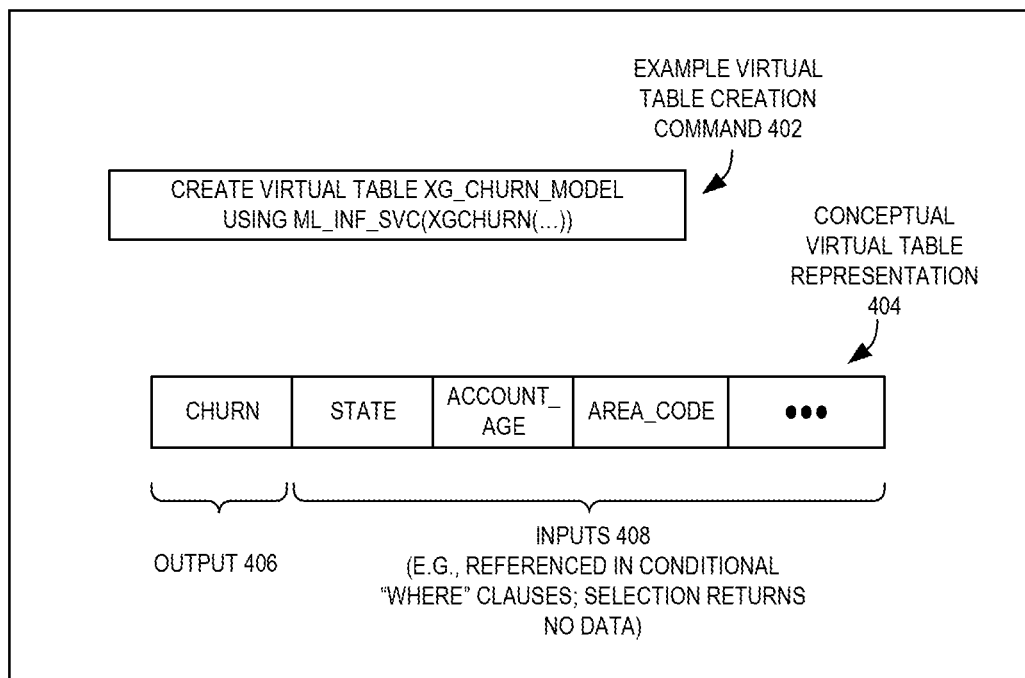
FIG. 4 is a diagram illustrating several exemplary machine learning inference database representations and model descriptors according to some embodiments.
Figure 4:
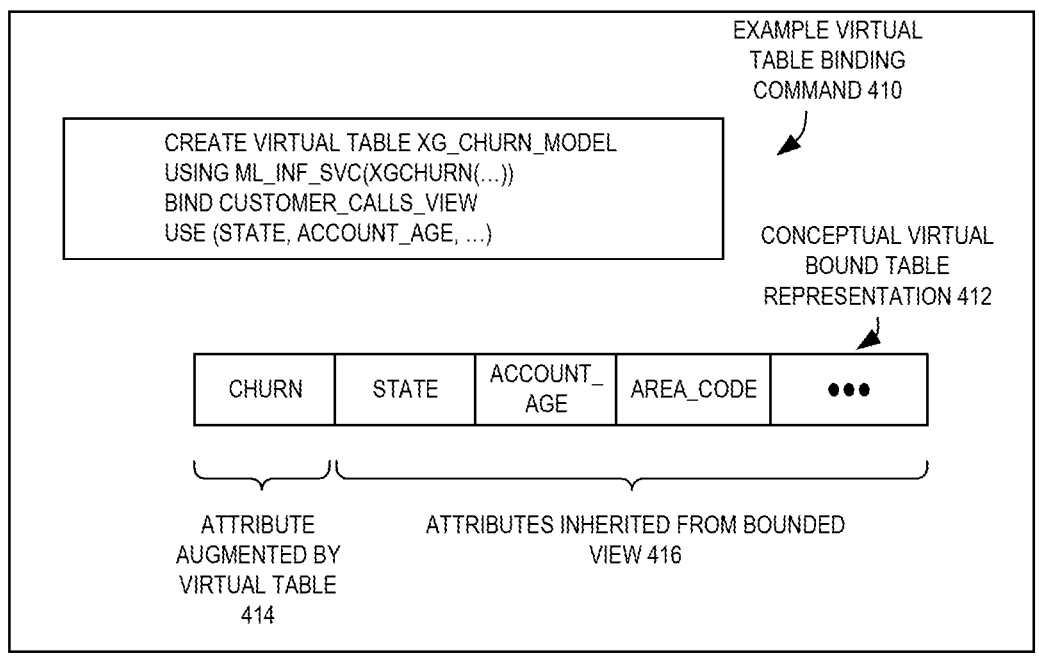
Figure 4:
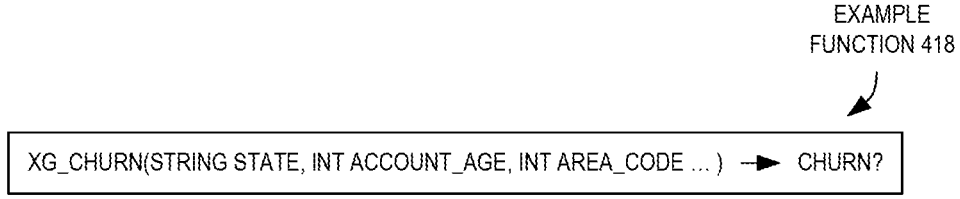

For further detail on how the queries identify that inference is required, and how the inference is triggered in a query, FIG. 4 is a diagram illustrating several exemplary machine learning inference database representations and model descriptors according to some embodiments. Several possible ways exist to represent the model by the database.

A first option is that a ML model could be represented as a virtual table, and thus a query may reference such a table. A virtual table includes no actual data and has a same interface as a normal database table, but instead maps to the API for the ML models. Such a table could be created with the command 402—"create virtual table xg_churn_model using ml_inf_svc(xgchurn( . . . ))", where a query may reference "xg_churn_model" to access the ML model, and the "using ml_inf_svc" indicates a need to reference a particular ML model—"xgchurn". A conceptual representation 404 of a such a table includes a first attribute (or column) of "churn", which is the output 406 of the inference, and possibly attributes for the inputs 408, the selection of which would include no data.

As another example, to simplify the virtual table interface, embodiments provide an interface that pre-binds input data sources to the virtual table. The xg_churn_model virtual table in the previous example could be pre-bound to a table, view, or a SQL query, for example, according to the command 410. The table representation 412 includes a "churn" attribute 414 that is augmented by the virtual table that implicitly uses the identified values from the bounded table for each corresponding row to obtain a prediction value. The table representation 412 also includes other attributes 416 that are inherited from the bounded view, which can be queried through this table as if queries were run directly against the user call view.

As another example, the interface could comprise a custom function 418 that can be referenced in queries—e.g., XG_CURN( . . . ), which returns the inference value.

As yet another example, a NoSQL interface could be created that is pre-bound to a table that contains all required inputs for model.

Several query examples are now provided to show how a query could access the ML model to perform inference according to these exemplary various constructs. These sample queries attempt to obtain an amount of customer churn per segment.

| Virtual table, no binding: |
|---|
| SELECT input.segment, sum(xg.churn)<br>FROM xg_churn_model AS xg,<br>(Select c.segment,<br>FROM customer as c, call_metrics as cm<br>WHERE c.id == cm.cid) AS input<br>WHERE xg.state = input, state ..... AND xg.intl_min = input.intl_min<br>GROUP BY input.segment |

| Virtual table, with binding: |
|---|
| SELECT xg.segment, sum(xg.churn)<br>FROM xg_churn_model as xg,<br>GROUP BY xg.segment |

| Function-based Interface |
|---|
| SELECT c.segment, sum(xg_boost(c.state ... , cm.intl_min))<br>FROM customer as c, call_metrics AS cm<br>WHERE c.id == cm.cid<br>GROUP BY c.segment |

NoSQL Interface:
To get a churn prediction for a particular customer (id=1):

| |
|---|
| { TableName: "xg_churn_model",<br>"AttributesToGet": [ "churn" ],<br>KeyConditionExpression: "id = :1 } |

Thus, a variety of ways exist to call for ML inference to be performed within some database query language standard.

Figure 5:
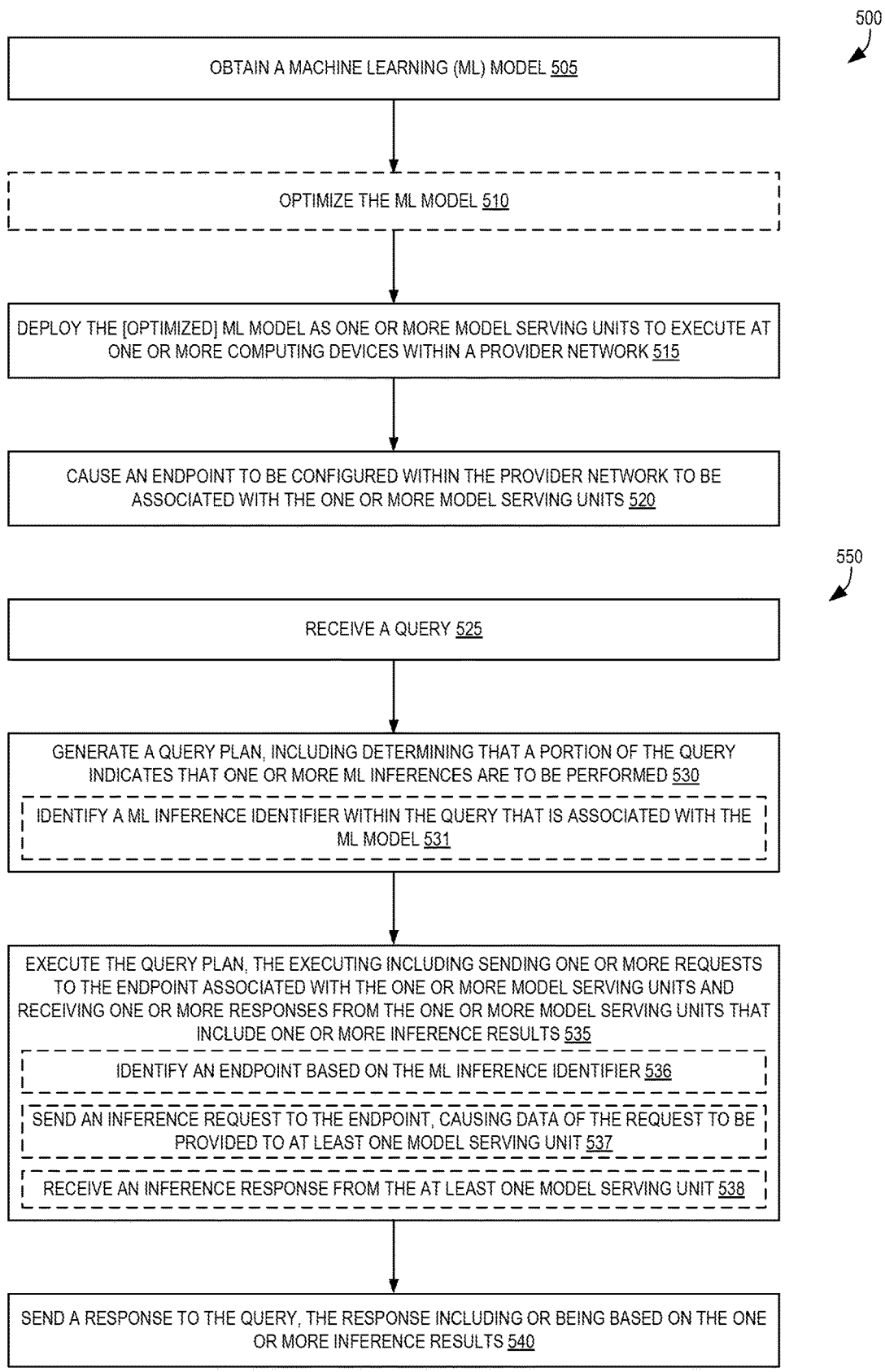
FIG. 5 is a flow diagram illustrating operations of methods for configuring and/or performing massively parallel real-time database-integrated machine learning inference according to some embodiments.

FIG. 5 is a flow diagram illustrating operations 500, 550 of methods for configuring and/or performing massively parallel real-time database-integrated machine learning inference according to some embodiments. Some or all of the operations 500, 550 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500, 550 are performed by the database service 114 of the other figures.

The operations 500 include, at block 505, obtaining a ML model. Block 505 can include requesting a ML model from a storage location (e.g., a URL or folder-type identifier) and then receiving the one or more files of the ML model. Block 505 may include receiving one or more files of the ML model in one or more messages (e.g., HTTP messages) originated by a computing device of a user, via the user's use of a GUI to submit the ML model. Block 505 may include receiving the ML model from a machine learning service that trained the model. The ML model may be sent along with a description of the input attribute(s) to the model and the output attribute(s) from the model. The ML model may have been trained according to a convention ML framework (e.g., TensorFlow, Apache MXNet, Chainer, PyTorch), and may comprise a neural network, classifier, regression model, etc.

Optionally, the operations 500 include, at block 510, optimizing the ML model. Block 510 could include network pruning, network consolidation, hardware-based optimization, etc.

The operations 500 include, at block 515, deploying the (optionally optimized) ML model as one or more model serving units to execute at one or more computing devices within a provider network. Each of the model serving units may comprise code to perform an inference according to the ML model, which may run inside a container or virtual machine. In some embodiments, multiple model serving units may be deployed for a single ML model. In some embodiments, the model serving units can only be accessed by a single database instance, though in other embodiments the model serving units can be accessed by multiples database instances of a single user, or of multiple users.

The operations 500 include, at block 520, causing an endpoint to be configured within the provider network to be associated with the one or more model serving units. Block 520 may include associating a hostname and/or network address with the model serving unit(s), configuring access control polices/rules, and/or publishing the hostname/address along with an identifier of the ML model (or model serving units).

At some point, another flow of operations 550 includes, at block 525, receiving a query. The query may have been originated by a device located outside of the provider network, or by a device within the provider network. The query may adhere to a query language standard, but may include a ML inference identifier (e.g., a table name, a function name, etc.) that indicates that a ML model is to be utilized to generate a result for the query.

The operations 550 include, at block 530, generating a query plan, including determining that a portion of the query indicates that one or more ML inferences are to be performed. Optionally, block 530 includes identifying a ML inference identifier within the query that is associated with the ML model.

The operations 550 also include, at block 535, executing (e.g., by one or more nodes) the query plan, the executing including sending one or more requests to the endpoint associated with the one or more model serving units and receiving one or more responses from the one or more model serving units that include one or more inference results. The sending of requests may be streamed or done on a per-request basis.

Optionally, block 535 includes one or more of: identifying an endpoint based on the ml inference identifier (at block 536); sending an inference request to the endpoint, causing data of the request to be provided to at least one model serving unit (at block 537); and/or receiving an inference response from the at least one model serving unit (at block 538).

The operations 550 further include, at block 540, sending a response to the query, the response including or being based on the one or more inference results. An inference result may be returned as a value of an attribute in the query response.

Figure 6:
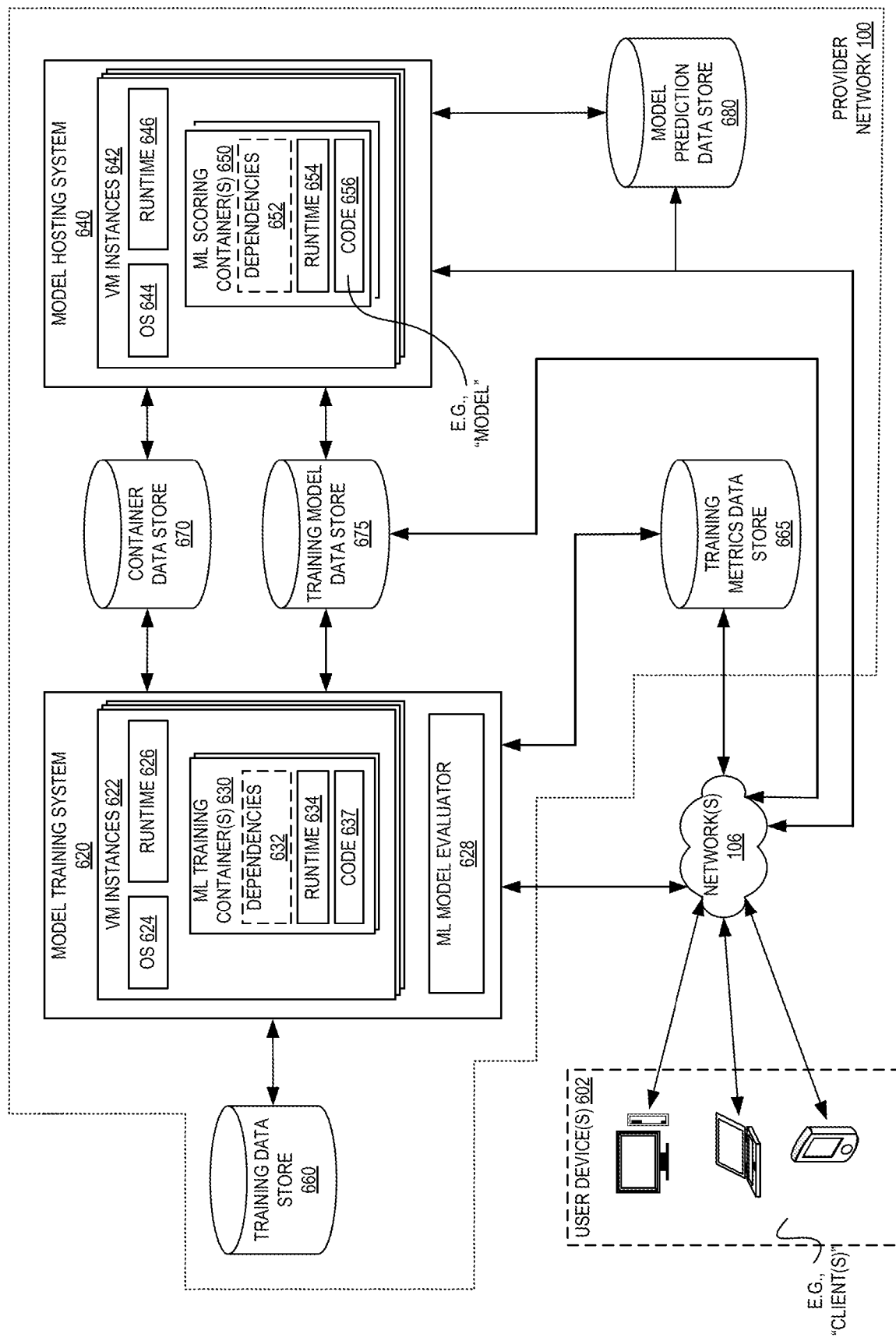
FIG. 6 is a block diagram of an illustrative operating environment in which machine learning models are trained and hosted according to some embodiments.

FIG. 6 is a block diagram of an illustrative operating environment in which machine learning models are trained and hosted according to some embodiments. The operating environment includes end user devices 602 (e.g., electronic device(s) 120), a model training system 620, a model hosting system 640, a training data store 660, a training metrics data store 665, a container data store 670, a training model data store 675, and a model prediction data store 680. A machine learning service described herein (e.g., ML service 104) may include one or more of these entities, such as the model hosting system 640, model training system 620, etc.

In some embodiments, users, by way of user devices 602, interact with the model training system 620 to provide data that causes the model training system 620 to train one or more machine learning models. A machine learning model, generally, may be thought of as one or more equations that are "trained" using a set of data. In some embodiments, the model training system 620 provides ML functionalities as a Web service, and thus messaging between user devices 602 and the model training system 620 (or provider network 100), and/or between components of the model training system 620 (or provider network 100), may utilize HTTP messages to transfer data in a machine-readable file format, such as eXtensible Markup Language (XML) or JavaScript Object Notation (JSON).

The user devices 602 can interact with the model training system 620 via frontend 629 of the model training system 620. For example, a user device 602 can provide a training request to the frontend 629 that includes a container image (or multiple container images, or an identifier of one or multiple locations where container images are stored), an indicator of input data (e.g., an address or location of input data), one or more hyperparameter values (e.g., values indicating how the algorithm will operate, how many algorithms to run in parallel, how many clusters into which to separate data, etc.), and/or information describing the computing machine on which to train a machine learning model (e.g., a graphical processing unit (GPU) instance type, a central processing unit (CPU) instance type, an amount of memory to allocate, a type of virtual machine instance to use for training, etc.).

In some embodiments, the container image can include one or more layers, where each layer represents an executable instruction. Some or all of the executable instructions together represent an algorithm that defines a machine learning model. The executable instructions (e.g., the algorithm) can be written in any programming language (e.g., Python, Ruby, C++, Java, etc.). In some embodiments, the algorithm is pre-generated and obtained by a user, via the user device 602, from an algorithm repository (e.g., a network-accessible marketplace, a data store provided by a machine learning training service, etc.). In some embodiments, the algorithm is completely user-generated or partially user-generated (e.g., user-provided code modifies or configures existing algorithmic code).

In some embodiments, instead of providing a container image (or identifier thereof) in the training request, the user device 602 may provide, in the training request, an algorithm written in any programming language. The model training system 620 then packages the algorithm into a container (optionally with other code, such as a "base" ML algorithm supplemented with user-provided code) that is eventually loaded into a virtual machine instance 622 for training a machine learning model, as described in greater detail below. For example, a user, via a user device 602, may develop an algorithm/code using an application (e.g., an interactive web-based programming environment) and cause the algorithm/code to be provided—perhaps as part of a training request (or referenced in a training request)—to the model training system 620, where this algorithm/code may be containerized on its own or used together with an existing container having a machine learning framework, for example.

In some embodiments, instead of providing a container image in the training request, the user device 602 provides, in the training request, an indicator of a container image (e.g., an indication of an address or a location at which a container image is stored). For example, the container image can be stored in a container data store 670, and this container image may have been previously created/uploaded by the user. The model training system 620 can retrieve the container image from the indicated location and create a container using the retrieved container image. The container is then loaded into a virtual machine instance 622 for training a machine learning model, as described in greater detail below.

The model training system 620 can use the information provided by the user device 602 to train a machine learning model in one or more pre-established virtual machine instances 622 in some embodiments. In particular, the model training system 620 includes a single physical computing device or multiple physical computing devices that are interconnected using one or more computing networks (not shown), where the physical computing device(s) host one or more virtual machine instances 622. The model training system 620 can handle the acquisition and configuration of compute capacity (e.g., containers, instances, etc., which are described in greater detail below) based on the information describing the computing machine on which to train a machine learning model provided by the user device 602. The model training system 620 can then train machine learning models using the compute capacity, as is described in greater detail below. The model training system 620 can automatically scale up and down based on the volume of training requests received from user devices 602 via frontend 629, thereby relieving the user from the burden of having to worry about over-utilization (e.g., acquiring too little computing resources and suffering performance issues) or under-utilization (e.g., acquiring more computing resources than necessary to train the machine learning models, and thus overpaying).

In some embodiments, the virtual machine instances 622 are utilized to execute tasks. For example, such tasks can include training a machine learning model. As shown in FIG. 6, each virtual machine instance 622 includes an operating system (OS) 624, a language runtime 626, and one or more ML training containers 630. Generally, the ML training containers 630 are logical units created within a virtual machine instance using the resources available on that instance and can be utilized to isolate execution of a task from other processes (e.g., task executions) occurring in the instance. In some embodiments, the ML training containers 630 are formed from one or more container images and a top container layer. Each container image may further include one or more image layers, where each image layer represents an executable instruction. As described above, some or all of the executable instructions together represent an algorithm that defines a machine learning model. Changes made to the ML training containers 630 (e.g., creation of new files, modification of existing files, deletion of files, etc.) are stored in the top container layer. If a ML training container 630 is deleted, the top container layer is also deleted. However, the container image(s) that form a portion of the deleted ML training container 630 can remain unchanged. The ML training containers 630 can be implemented, for example, as Linux containers (LXC), Docker containers, and the like.

The ML training containers 630 may include individual a runtime 634, code 637, and dependencies 632 needed by the code 637 in some embodiments. The runtime 634 can be defined by one or more executable instructions that form at least a portion of a container image that is used to form the ML training container 630 (e.g., the executable instruction(s) in the container image that define the operating system and/or runtime to run in the container formed from the container image). The code 637 includes one or more executable instructions that form at least a portion of a container image that is used to form the ML training container 630. For example, the code 637 includes the executable instructions in the container image that represent an algorithm that defines a machine learning model, which may reference (or utilize) code or libraries from dependencies 632. The runtime 634 is configured to execute the code 637 in response to an instruction to begin machine learning model training. Execution of the code 637 results in the generation of model data, as described in greater detail below.

In some embodiments, the code 637 includes executable instructions that represent algorithms that define different machine learning models. For example, the code 637 includes one set of executable instructions that represent a first algorithm that defines a first machine learning model and a second set of executable instructions that represent a second algorithm that defines a second machine learning model. In some embodiments, the virtual machine instance 622 executes the code 637 and trains all of the machine learning models. In some embodiments, the virtual machine instance 622 executes the code 637, selecting one of the machine learning models to train. For example, the virtual machine instance 622 can identify a type of training data indicated by the training request and select a machine learning model to train (e.g., execute the executable instructions that represent an algorithm that defines the selected machine learning model) that corresponds with the identified type of training data.

In some embodiments, the runtime 634 is the same as the runtime 626 utilized by the virtual machine instance 622. In some embodiments, the runtime 634 is different than the runtime 626 utilized by the virtual machine instance 622.

In some embodiments, the model training system 620 uses one or more container images included in a training request (or a container image retrieved from the container data store 670 in response to a received training request) to create and initialize a ML training container 630 in a virtual machine instance 622. For example, the model training system 620 creates a ML training container 630 that includes the container image(s) and/or a top container layer.

Prior to beginning the training process, in some embodiments, the model training system 620 retrieves training data from the location indicated in the training request. For example, the location indicated in the training request can be a location in the training data store 660. Thus, the model training system 620 retrieves the training data from the indicated location in the training data store 660. In some embodiments, the model training system 620 does not retrieve the training data prior to beginning the training process. Rather, the model training system 620 streams the training data from the indicated location during the training process. For example, the model training system 620 can initially retrieve a portion of the training data and provide the retrieved portion to the virtual machine instance 622 training the machine learning model. Once the virtual machine instance 622 has applied and used the retrieved portion or once the virtual machine instance 622 is about to use all of the retrieved portion (e.g., a buffer storing the retrieved portion is nearly empty), then the model training system 620 can retrieve a second portion of the training data and provide the second retrieved portion to the virtual machine instance 622, and so on.

To perform the machine learning model training, the virtual machine instance 622 executes code 637 stored in the ML training container 630 in some embodiments. For example, the code 637 includes some or all of the executable instructions that form the container image of the ML training container 630 initialized therein. Thus, the virtual machine instance 622 executes some or all of the executable instructions that form the container image of the ML training container 630 initialized therein to train a machine learning model. The virtual machine instance 622 executes some or all of the executable instructions according to the hyperparameter values included in the training request. As an illustrative example, the virtual machine instance 622 trains a machine learning model by identifying values for certain parameters (e.g., coefficients, weights, centroids, etc.). The identified values depend on hyperparameters that define how the training is performed. Thus, the virtual machine instance 622 can execute the executable instructions to initiate a machine learning model training process, where the training process is run using the hyperparameter values included in the training request. Execution of the executable instructions can include the virtual machine instance 622 applying the training data retrieved by the model training system 620 as input parameters to some or all of the instructions being executed.

In some embodiments, executing the executable instructions causes the virtual machine instance 622 (e.g., the ML training container 630) to generate model data. For example, the ML training container 630 generates model data and stores the model data in a file system of the ML training container 630. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 630 such that the model data is written to the top container layer of the ML training container 630 and/or the container image(s) that forms a portion of the ML training container 630 is modified to include the model data.

The virtual machine instance 622 (or the model training system 620 itself) pulls the generated model data from the ML training container 630 and stores the generated model data in the training model data store 675 in an entry associated with the virtual machine instance 622 and/or the machine learning model being trained. In some embodiments, the virtual machine instance 622 generates a single file that includes model data and stores the single file in the training model data store 675. In some embodiments, the virtual machine instance 622 generates multiple files during the course of training a machine learning model, where each file includes model data. In some embodiments, each model data file includes the same or different model data information (e.g., one file identifies the structure of an algorithm, another file includes a list of coefficients, etc.). The virtual machine instance 622 can package the multiple files into a single file once training is complete and store the single file in the training model data store 675. Alternatively, the virtual machine instance 622 stores the multiple files in the training model data store 675. The virtual machine instance 622 stores the file(s) in the training model data store 675 while the training process is ongoing and/or after the training process is complete.

In some embodiments, the virtual machine instance 622 regularly stores model data file(s) in the training model data store 675 as the training process is ongoing. Thus, model data file(s) can be stored in the training model data store 675 at different times during the training process. Each set of model data files corresponding to a particular time or each set of model data files present in the training model data store 675 as of a particular time could be checkpoints that represent different versions of a partially-trained machine learning model during different stages of the training process. Accordingly, before training is complete, a user, via the user device 602 can submit a deployment and/or execution request in a manner as described below to deploy and/or execute a version of a partially trained machine learning model (e.g., a machine learning model trained as of a certain stage in the training process). A version of a partially-trained machine learning model can be based on some or all of the model data files stored in the training model data store 675.

In some embodiments, a virtual machine instance 622 executes code 637 stored in a plurality of ML training containers 630. For example, the algorithm included in the container image can be in a format that allows for the parallelization of the training process. Thus, the model training system 620 can create multiple copies of the container image provided in a training request and cause the virtual machine instance 622 to load each container image copy in a separate ML training container 630. The virtual machine instance 622 can then execute, in parallel, the code 637 stored in the ML training containers 630. The virtual machine instance 622 can further provide configuration information to each ML training container 630 (e.g., information indicating that N ML training containers 630 are collectively training a machine learning model and that a particular ML training container 630 receiving the configuration information is ML training container 630 number X of N), which can be included in the resulting model data. By parallelizing the training process, the model training system 620 can significantly reduce the training time in some embodiments.

In some embodiments, a plurality of virtual machine instances 622 execute code 637 stored in a plurality of ML training containers 630. For example, the resources used to train a particular machine learning model can exceed the limitations of a single virtual machine instance 622. However, the algorithm included in the container image can be in a format that allows for the parallelization of the training process. Thus, the model training system 620 can create multiple copies of the container image provided in a training request, initialize multiple virtual machine instances 622, and cause each virtual machine instance 622 to load a container image copy in one or more separate ML training containers 630. The virtual machine instances 622 can then each execute the code 637 stored in the ML training containers 630 in parallel. The model training system 620 can further provide configuration information to each ML training container 630 via the virtual machine instances 622 (e.g., information indicating that N ML training containers 630 are collectively training a machine learning model and that a particular ML training container 630 receiving the configuration information is ML training container 630 number X of N, information indicating that M virtual machine instances 622 are collectively training a machine learning model and that a particular ML training container 630 receiving the configuration information is initialized in virtual machine instance 622 number Y of M, etc.), which can be included in the resulting model data. As described above, by parallelizing the training process, the model training system 620 can significantly reduce the training time in some embodiments.

In some embodiments, the model training system 620 includes a plurality of physical computing devices and two or more of the physical computing devices hosts one or more virtual machine instances 622 that execute the code 637. Thus, the parallelization can occur over different physical computing devices in addition to over different virtual machine instances 622 and/or ML training containers 630.

In some embodiments, the model training system 620 includes a ML model evaluator 628. The ML model evaluator 628 can monitor virtual machine instances 622 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (e.g., a level of confidence that the accuracy of the machine learning model being trained is known, etc. The ML model evaluator 628 can obtain the model data for a machine learning model being trained and evaluation data from the training data store 660. The evaluation data is separate from the data used to train a machine learning model and includes both input data and expected outputs (e.g., known results), and thus the ML model evaluator 628 can define a machine learning model using the model data and execute the machine learning model by providing the input data as inputs to the machine learning model. The ML model evaluator 628 can then compare the outputs of the machine learning model to the expected outputs and determine one or more quality metrics of the machine learning model being trained based on the comparison (e.g., the error rate can be a difference or distance between the machine learning model outputs and the expected outputs).

The ML model evaluator 628 periodically generates model metrics during the training process and stores the model metrics in the training metrics data store 665 in some embodiments. While the machine learning model is being trained, a user, via the user device 602, can access and retrieve the model metrics from the training metrics data store 665. The user can then use the model metrics to determine whether to adjust the training process and/or to stop the training process. For example, the model metrics can indicate that the machine learning model is performing poorly (e.g., has an error rate above a threshold value, has a statistical distribution that is not an expected or desired distribution (e.g., not a binomial distribution, a Poisson distribution, a geometric distribution, a normal distribution, Gaussian distribution, etc.), has an execution latency above a threshold value, has a confidence level below a threshold value)) and/or is performing progressively worse (e.g., the quality metric continues to worsen over time). In response, in some embodiments, the user, via the user device 602, can transmit a request to the model training system 620 to modify the machine learning model being trained (e.g., transmit a modification request). The request can include a new or modified container image, a new or modified algorithm, new or modified hyperparameter(s), and/or new or modified information describing the computing machine on which to train a machine learning model. The model training system 620 can modify the machine learning model accordingly. For example, the model training system 620 can cause the virtual machine instance 622 to optionally delete an existing ML training container 630, create and initialize a new ML training container 630 using some or all of the information included in the request, and execute the code 637 stored in the new ML training container 630 to restart the machine learning model training process. As another example, the model training system 620 can cause the virtual machine instance 622 to modify the execution of code stored in an existing ML training container 630 according to the data provided in the modification request. In some embodiments, the user, via the user device 602, can transmit a request to the model training system 620 to stop the machine learning model training process. The model training system 620 can then instruct the virtual machine instance 622 to delete the ML training container 630 and/or to delete any model data stored in the training model data store 675.

As described below, in some embodiments, the model data stored in the training model data store 675 is used by the model hosting system 640 to deploy machine learning models. Alternatively or additionally, a user device 602 or another computing device (not shown) can retrieve the model data from the training model data store 675 to implement a learning algorithm in an external device. As an illustrative example, a robotic device can include sensors to capture input data. A user device 602 can retrieve the model data from the training model data store 675 and store the model data in the robotic device. The model data defines a machine learning model. Thus, the robotic device can provide the captured input data as an input to the machine learning model, resulting in an output. The robotic device can then perform an action (e.g., move forward, raise an arm, generate a sound, etc.) based on the resulting output.

While the virtual machine instances 622 are shown in FIG. 6 as a single grouping of virtual machine instances 622, some embodiments of the present application separate virtual machine instances 622 that are actively assigned to execute tasks from those virtual machine instances 622 that are not actively assigned to execute tasks. For example, those virtual machine instances 622 actively assigned to execute tasks are grouped into an "active pool," while those virtual machine instances 622 not actively assigned to execute tasks are placed within a "warming pool." In some embodiments, those virtual machine instances 622 within the warming pool can be pre-initialized with an operating system, language runtimes, and/or other software required to enable rapid execution of tasks (e.g., rapid initialization of machine learning model training in ML training container(s) 630) in response to training requests.

In some embodiments, the model training system 620 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 602, the model hosting system 640, etc.). The processing unit can also communicate to and from a memory of a virtual machine instance 622 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 640 includes a single physical computing device or multiple physical computing devices that are interconnected using one or more computing networks (not shown), where the physical computing device(s) host one or more virtual machine instances 642. The model hosting system 640 can handle the acquisition and configuration of compute capacity (e.g., containers, instances, etc.) based on demand for the execution of trained machine learning models. The model hosting system 640 can then execute machine learning models using the compute capacity, as is described in greater detail below. The model hosting system 640 can automatically scale up and down based on the volume of execution requests received from user devices 602 via frontend 649 of the model hosting system 640, thereby relieving the user from the burden of having to worry about over-utilization (e.g., acquiring too little computing resources and suffering performance issues) or under-utilization (e.g., acquiring more computing resources than necessary to run the machine learning models, and thus overpaying).

In some embodiments, the virtual machine instances 642 are utilized to execute tasks. For example, such tasks can include executing a machine learning model. As shown in FIG. 6, each virtual machine instance 642 includes an operating system (OS) 644, a language runtime 646, and one or more ML scoring containers 650. The ML scoring containers 650 are similar to the ML training containers 630 in that the ML scoring containers 650 are logical units created within a virtual machine instance using the resources available on that instance and can be utilized to isolate execution of a task from other processes (e.g., task executions) occurring in the instance. In some embodiments, the ML scoring containers 650 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 650 (e.g., creation of new files, modification of existing files, deletion of files, etc.) are stored in the top container layer. If a ML scoring container 650 is deleted, the top container layer is also deleted. However, the container image(s) that form a portion of the deleted ML scoring container 650 can remain unchanged. The ML scoring containers 650 can be implemented, for example, as Linux containers.

The ML scoring containers 650 each include a runtime 654, code 656, and dependencies 652 (e.g., supporting software such as libraries) needed by the code 656 in some embodiments. The runtime 654 can be defined by one or more executable instructions that form at least a portion of a container image that is used to form the ML scoring container 650 (e.g., the executable instruction(s) in the container image that define the operating system and/or runtime to run in the container formed from the container image). The code 656 includes one or more executable instructions that form at least a portion of a container image that is used to form the ML scoring container 650. For example, the code 656 includes the executable instructions in the container image that represent an algorithm that defines a machine learning model, which may reference dependencies 652. The code 656 can also include model data that represent characteristics of the defined machine learning model, as described in greater detail below. The runtime 654 is configured to execute the code 656 in response to an instruction to begin execution of a machine learning model. Execution of the code 656 results in the generation of outputs (e.g., predicted results), as described in greater detail below.

In some embodiments, the runtime 654 is the same as the runtime 646 utilized by the virtual machine instance 642. In some embodiments, runtime 654 is different than the runtime 646 utilized by the virtual machine instance 642.

In some embodiments, the model hosting system 640 uses one or more container images included in a deployment request (or a container image retrieved from the container data store 670 in response to a received deployment request) to create and initialize a ML scoring container 650 in a virtual machine instance 642. For example, the model hosting system 640 creates a ML scoring container 650 that includes the container image(s) and/or a top container layer.

As described above, a user device 602 can submit a deployment request and/or an execution request to the model hosting system 640 via the frontend 649 in some embodiments. A deployment request causes the model hosting system 640 to deploy a trained machine learning model into a virtual machine instance 642. For example, the deployment request can include an identification of an endpoint (e.g., an endpoint name, such as an HTTP endpoint name) and an identification of one or more trained machine learning models (e.g., a location of one or more model data files stored in the training model data store 675). Optionally, the deployment request also includes an identification of one or more container images stored in the container data store 670.

Upon receiving the deployment request, the model hosting system 640 initializes ones or more ML scoring containers 650 in one or more hosted virtual machine instance 642. In embodiments in which the deployment request includes an identification of one or more container images, the model hosting system 640 forms the ML scoring container(s) 650 from the identified container image(s). For example, a container image identified in a deployment request can be the same container image used to form an ML training container 630 used to train the machine learning model corresponding to the deployment request. Thus, the code 656 of the ML scoring container(s) 650 includes one or more executable instructions in the container image(s) that represent an algorithm that defines a machine learning model. In embodiments in which the deployment request does not include an identification of a container image, the model hosting system 640 forms the ML scoring container(s) 650 from one or more container images stored in the container data store 670 that are appropriate for executing the identified trained machine learning model(s). For example, an appropriate container image can be a container image that includes executable instructions that represent an algorithm that defines the identified trained machine learning model(s).

The model hosting system 640 further forms the ML scoring container(s) 650 by retrieving model data corresponding to the identified trained machine learning model(s) in some embodiments. For example, the deployment request can identify a location of model data file(s) stored in the training model data store 675. In embodiments in which a single model data file is identified in the deployment request, the model hosting system 640 retrieves the identified model data file from the training model data store 675 and inserts the model data file into a single ML scoring container 650, which forms a portion of code 656. In some embodiments, the model data file is archived or compressed (e.g., formed from a package of individual files). Thus, the model hosting system 640 unarchives or decompresses the model data file to obtain multiple individual files and inserts the individual files into the ML scoring container 650. In some embodiments, the model hosting system 640 stores the model data file in the same location as the location in which the model data file was stored in the ML training container 630 that generated the model data file. For example, the model data file initially was stored in the top container layer of the ML training container 630 at a certain offset, and the model hosting system 640 then stores the model data file in the top container layer of the ML scoring container 650 at the same offset.

In embodiments in which multiple model data files are identified in the deployment request, the model hosting system 640 retrieves the identified model data files from the training model data store 675. The model hosting system 640 can insert the model data files into the same ML scoring container 650, into different ML scoring containers 650 initialized in the same virtual machine instance 642, or into different ML scoring containers 650 initialized in different virtual machine instances 642. As an illustrative example, the deployment request can identify multiple model data files corresponding to different trained machine learning models because the trained machine learning models are related (e.g., the output of one trained machine learning model is used as an input to another trained machine learning model). Thus, the user may desire to deploy multiple machine learning models to eventually receive a single output that relies on the outputs of multiple machine learning models.

In some embodiments, the model hosting system 640 associates the initialized ML scoring container(s) 650 with the endpoint identified in the deployment request. For example, each of the initialized ML scoring container(s) 650 can be associated with a network address. The model hosting system 640 can map the network address(es) to the identified endpoint, and the model hosting system 640 or another system (e.g., a routing system, not shown) can store the mapping. Thus, a user device 602 can refer to trained machine learning model(s) stored in the ML scoring container(s) 650 using the endpoint. This allows for the network address of an ML scoring container 650 to change without causing the user operating the user device 602 to change the way in which the user refers to a trained machine learning model.

Once the ML scoring container(s) 650 are initialized, the ML scoring container(s) 650 are ready to execute trained machine learning model(s). In some embodiments, the user device 602 transmits an execution request to the model hosting system 640 via the frontend 649, where the execution request identifies an endpoint and includes an input to a machine learning model (e.g., a set of input data). The model hosting system 640 or another system (e.g., a routing system, not shown) can obtain the execution request, identify the ML scoring container(s) 650 corresponding to the identified endpoint, and route the input to the identified ML scoring container(s) 650.

In some embodiments, a virtual machine instance 642 executes the code 656 stored in an identified ML scoring container 650 in response to the model hosting system 640 receiving the execution request. In particular, execution of the code 656 causes the executable instructions in the code 656 corresponding to the algorithm to read the model data file stored in the ML scoring container 650, use the input included in the execution request as an input parameter, and generate a corresponding output. As an illustrative example, the algorithm can include coefficients, weights, layers, cluster centroids, and/or the like. The executable instructions in the code 656 corresponding to the algorithm can read the model data file to determine values for the coefficients, weights, layers, cluster centroids, and/or the like. The executable instructions can include input parameters, and the input included in the execution request can be supplied by the virtual machine instance 642 as the input parameters. With the machine learning model characteristics and the input parameters provided, execution of the executable instructions by the virtual machine instance 642 can be completed, resulting in an output.

In some embodiments, the virtual machine instance 642 stores the output in the model prediction data store 680. Alternatively or in addition, the virtual machine instance 642 transmits the output to the user device 602 that submitted the execution result via the frontend 649.

In some embodiments, the execution request corresponds to a group of related trained machine learning models. Thus, the ML scoring container 650 can transmit the output to a second ML scoring container 650 initialized in the same virtual machine instance 642 or in a different virtual machine instance 642. The virtual machine instance 642 that initialized the second ML scoring container 650 can then execute second code 656 stored in the second ML scoring container 650, providing the received output as an input parameter to the executable instructions in the second code 656. The second ML scoring container 650 further includes a model data file stored therein, which is read by the executable instructions in the second code 656 to determine values for the characteristics defining the machine learning model. Execution of the second code 656 results in a second output. The virtual machine instance 642 that initialized the second ML scoring container 650 can then transmit the second output to the model prediction data store 680 and/or the user device 602 via the frontend 649 (e.g., if no more trained machine learning models are needed to generate an output) or transmit the second output to a third ML scoring container 650 initialized in the same or different virtual machine instance 642 (e.g., if outputs from one or more additional trained machine learning models are needed), and the above-referenced process can be repeated with respect to the third ML scoring container 650.

While the virtual machine instances 642 are shown in FIG. 6 as a single grouping of virtual machine instances 642, some embodiments of the present application separate virtual machine instances 642 that are actively assigned to execute tasks from those virtual machine instances 642 that are not actively assigned to execute tasks. For example, those virtual machine instances 642 actively assigned to execute tasks are grouped into an "active pool," while those virtual machine instances 642 not actively assigned to execute tasks are placed within a "warming pool." In some embodiments, those virtual machine instances 642 within the warming pool can be pre-initialized with an operating system, language runtimes, and/or other software required to enable rapid execution of tasks (e.g., rapid initialization of ML scoring container(s) 650, rapid execution of code 656 in ML scoring container(s), etc.) in response to deployment and/or execution requests.

In some embodiments, the model hosting system 640 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 602, the model training system 620, etc.). The processing unit can also communicate to and from a memory of a virtual machine instance 642 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 620 and the model hosting system 640 depicted in FIG. 6 are not meant to be limiting. For example, the model training system 620 and/or the model hosting system 640 could also operate within a computing environment having a fewer or greater number of devices than are illustrated in FIG. 6. Thus, the depiction of the model training system 620 and/or the model hosting system 640 in FIG. 6 may be taken as illustrative and not limiting to the present disclosure. For example, the model training system 620 and/or the model hosting system 640 or various constituents thereof could implement various Web services components, hosted or "cloud" computing environments, and/or peer-to-peer network configurations to implement at least a portion of the processes described herein. In some embodiments, the model training system 620 and/or the model hosting system 640 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 629 processes all training requests received from user devices 602 and provisions virtual machine instances 622. In some embodiments, the frontend 629 serves as a front door to all the other services provided by the model training system 620. The frontend 629 processes the requests and makes sure that the requests are properly authorized. For example, the frontend 629 may determine whether the user associated with the training request is authorized to initiate the training process.

Similarly, frontend 649 processes all deployment and execution requests received from user devices 602 and provisions virtual machine instances 642. In some embodiments, the frontend 649 serves as a front door to all the other services provided by the model hosting system 640. The frontend 649 processes the requests and makes sure that the requests are properly authorized. For example, the frontend 649 may determine whether the user associated with a deployment request or an execution request is authorized to access the indicated model data and/or to execute the indicated machine learning model.

The training data store 660 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 660 is depicted as being located external to the model training system 620 and the model hosting system 640, this is not meant to be limiting. For example, in some embodiments not shown, the training data store 660 is located internal to at least one of the model training system 620 or the model hosting system 640.

In some embodiments, the training metrics data store 665 stores model metrics. While the training metrics data store 665 is depicted as being located external to the model training system 620 and the model hosting system 640, this is not meant to be limiting. For example, in some embodiments not shown, the training metrics data store 665 is located internal to at least one of the model training system 620 or the model hosting system 640.

The container data store 670 stores container images, such as container images used to form ML training containers 630 and/or ML scoring containers 650, that can be retrieved by various virtual machine instances 622 and/or 642. While the container data store 670 is depicted as being located external to the model training system 620 and the model hosting system 640, this is not meant to be limiting. For example, in some embodiments not shown, the container data store 670 is located internal to at least one of the model training system 620 and the model hosting system 640.

The training model data store 675 stores model data files. In some embodiments, some of the model data files are comprised of a single file, while other model data files are packages of multiple individual files. While the training model data store 675 is depicted as being located external to the model training system 620 and the model hosting system 640, this is not meant to be limiting. For example, in some embodiments not shown, the training model data store 675 is located internal to at least one of the model training system 620 or the model hosting system 640.

The model prediction data store 680 stores outputs (e.g., execution results) generated by the ML scoring containers 650 in some embodiments. While the model prediction data store 680 is depicted as being located external to the model training system 620 and the model hosting system 640, this is not meant to be limiting. For example, in some embodiments not shown, the model prediction data store 680 is located internal to at least one of the model training system 620 and the model hosting system 640.

While the model training system 620, the model hosting system 640, the training data store 660, the training metrics data store 665, the container data store 670, the training model data store 675, and the model prediction data store 680 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (e.g., also referred to herein as a machine learning service) can communicate with one or more of the user devices 602 via the one or more network(s) 106.

Various example user devices 602 are shown in FIG. 6, including a desktop computer, laptop, and a mobile phone, each provided by way of illustration. In general, the user devices 602 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 620 and/or the model hosting system 640 provides the user devices 602 with one or more user interfaces, command-line interfaces (CLI), application programming interfaces (API), and/or other programmatic interfaces for submitting training requests, deployment requests, and/or execution requests. In some embodiments, the user devices 602 can execute a stand-alone application that interacts with the model training system 620 and/or the model hosting system 640 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (e.g., for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 7:
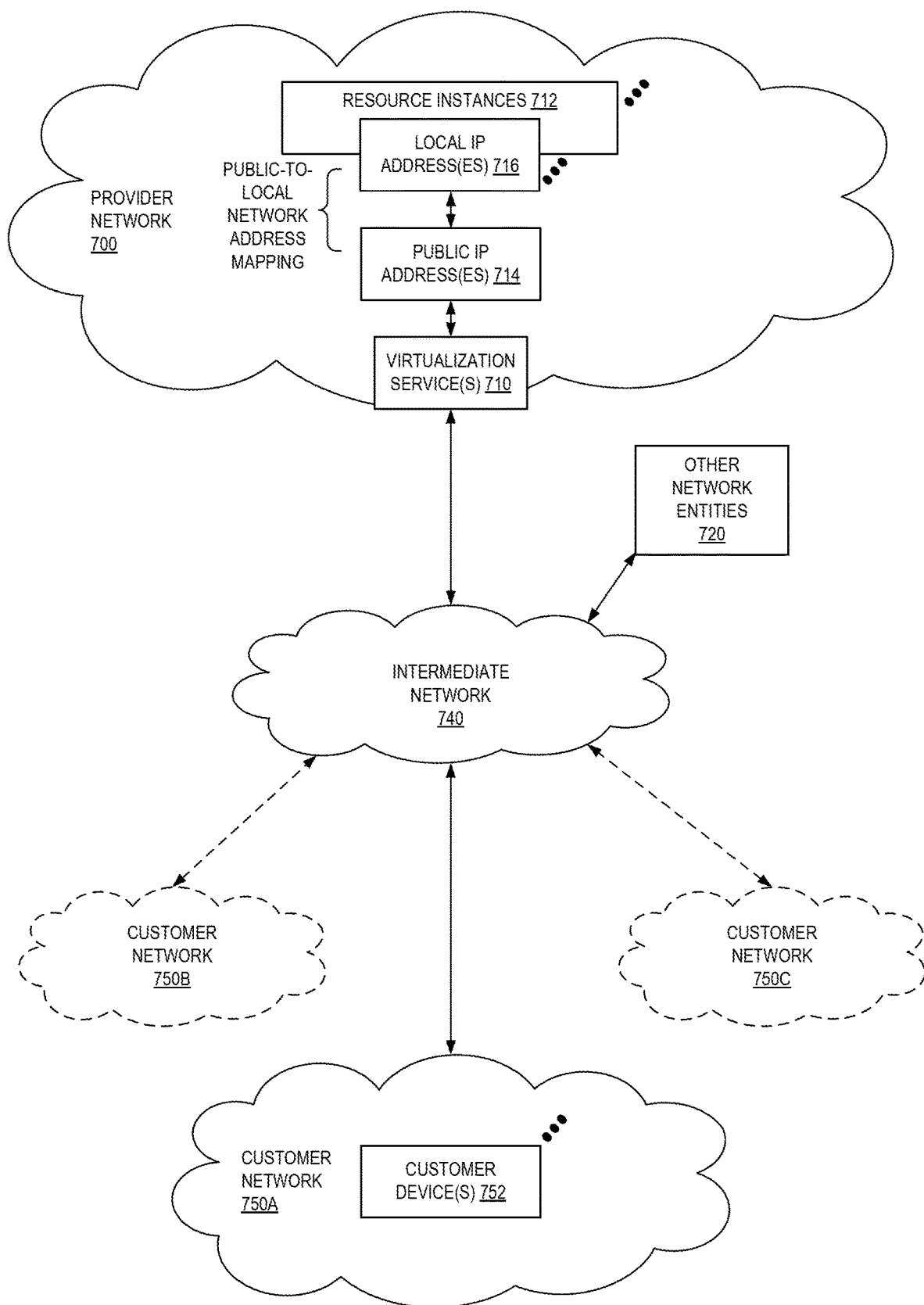
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
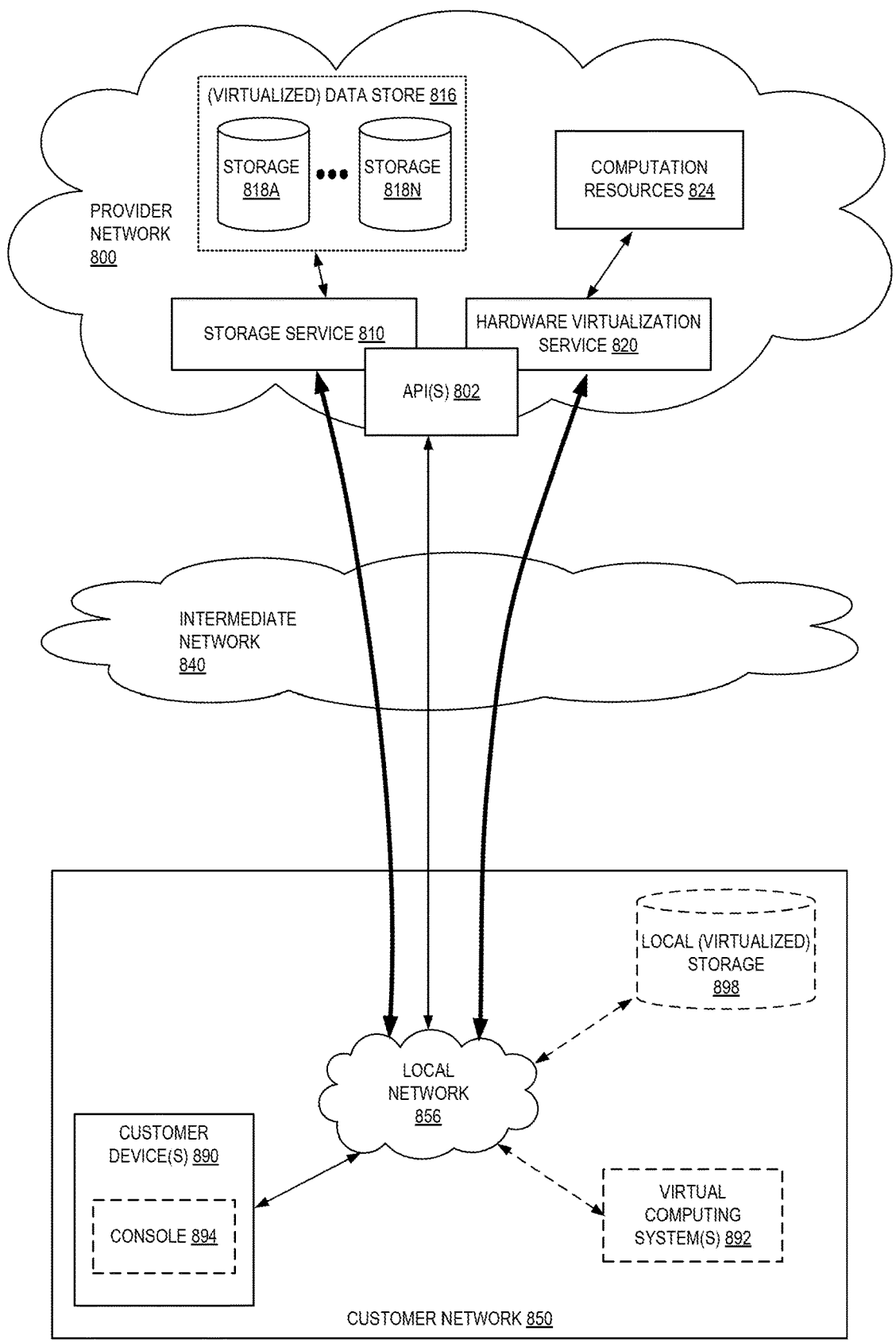
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
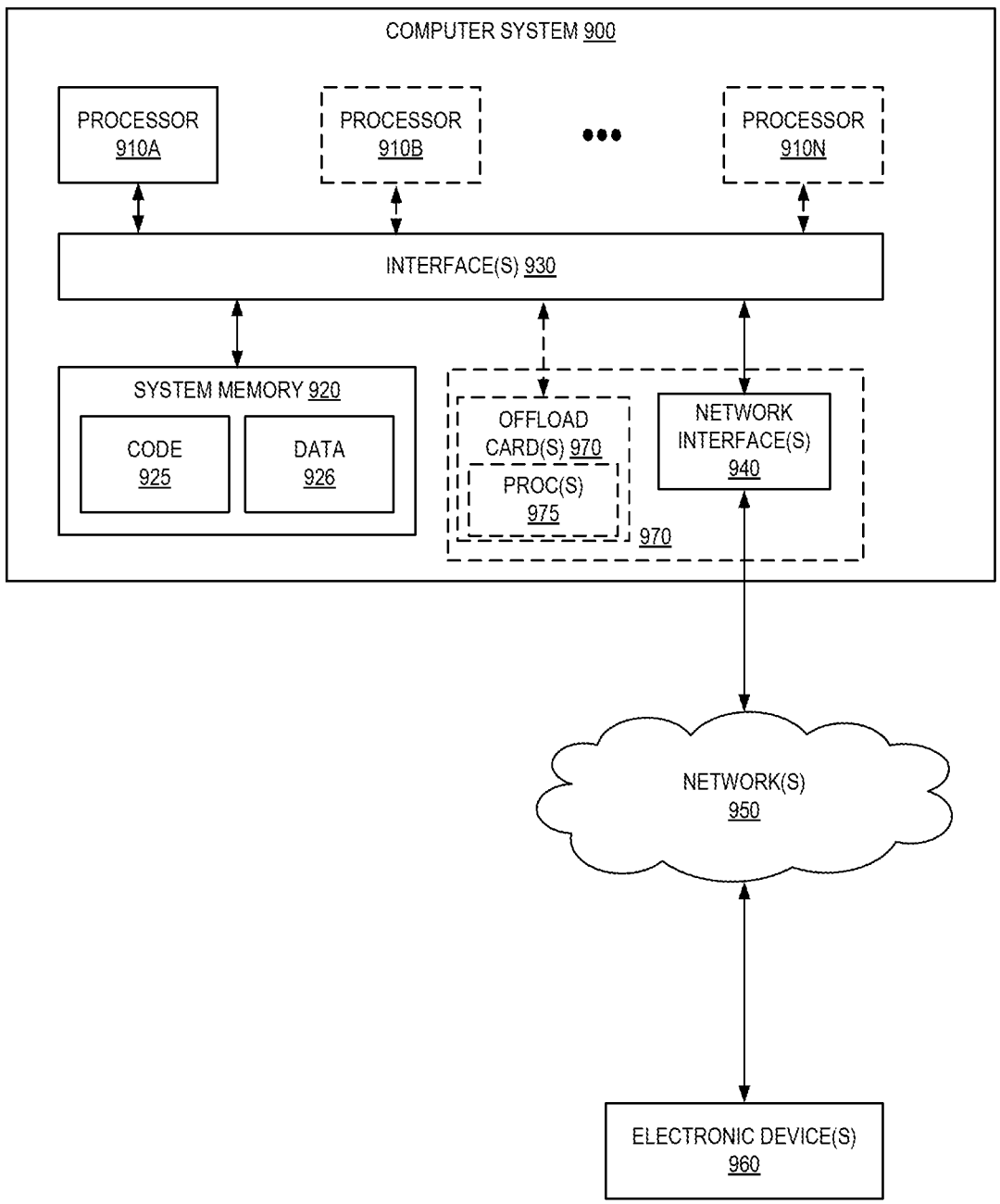
FIG. 9 is a block diagram illustrating an example computer system that may be used in some embodiments.

In some embodiments, a system that implements a portion or all of the techniques for configuring and/or performing massively parallel real-time database-integrated machine learning inference as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a machine learning (ML) model;
   optimizing the ML model;
   deploying the optimized ML model as one or more model serving units to execute at one or more computing devices within a provider network;
   configuring an endpoint within the provider network associated with the one or more model serving units;
   receiving, at a database within the provider network, a query;
   generating a query plan, the generating including determining that a portion of the query indicates that one or more ML inferences are to be performed;
   executing the query plan, the executing including:
      executing, by a first computing node of a plurality of computing nodes of the database, a first portion of the query plan, the first portion including obtaining, by the first computing node, endpoint information for the ML model run at a first model serving unit of the one or more model serving units, the first portion further including the first computing node issuing, via the endpoint, a first inference request to the first model serving unit, and obtaining, via the endpoint, a first one or more inferences generated by the first model serving unit; and
      executing, by a second computing node of the plurality of computing nodes, a second portion of the query plan, the second portion including obtaining, by the second computing node, endpoint information for the ML model run at a second model serving unit of the one or more model serving units, the second portion further including the second computing node issuing, via the endpoint, a second inference request to the second model serving unit, and obtaining, via the endpoint, a second one or more inferences generated by the second model serving unit; and
   sending a response to the query, the response including or being based on the first and second one or more inferences.

2. The computer-implemented method of claim 1, further comprising:
   adding additional model serving units or removing one or more of the one or more model serving units based on an analysis of at least one of:
      an amount of resource usage of at least one of the one or more model serving units, the resource usage comprising at least one of processing utilization, memory utilization, or network utilization of the at least one model serving unit;
      amounts or types of query activity of the database over a period of time; or
      a data profile describing data of the database.

3. The computer-implemented method of claim 1, wherein determining that the portion of the query indicates that one or more ML inferences are to be performed includes identifying a table name of the query that corresponds to a virtual table associated with the ML model.

4. A computer-implemented method comprising:
receiving, at a database within a provider network, a query;
generating a query plan for the query, the generating including determining that a portion of the query indicates that one or more machine learning (ML) inferences are to be performed;
executing the query plan, the executing including:
executing, by a first computing node of a plurality of computing nodes of the database, a first portion of the query plan, the first portion including obtaining, by the first computing node, endpoint information for a ML model run at a first model serving unit of one or more model serving units, the first portion further including the first computing node issuing, via an endpoint, a first inference request to the first model serving unit, and obtaining, via the endpoint, a first one or more inferences generated by the first model serving unit; and
executing, by a second computing node of the plurality of computing nodes, a second portion of the query plan, the second portion including obtaining, by the second computing node, endpoint information for the ML model run at a second model serving unit of the one or more model serving units, the second portion further including the second computing node issuing, via the endpoint, a second inference request to the second model serving unit, and obtaining, via the endpoint, a second one or more inferences generated by the second model serving unit; and
sending a response to the query, the response including or being based on the first and second one or more inferences.

5. The computer-implemented method of claim 4, further comprising:
obtaining the machine learning (ML) model;
deploying the ML model as the one or more model serving units; and
configuring the endpoint to be associated with the one or more model serving units.

6. The computer-implemented method of claim 5, wherein obtaining the ML model comprises one of:
obtaining a source ML model from a storage location of a storage service of the provider network;
obtaining the source ML model from a ML service of the provider network that trained the source ML model; or
receiving the source ML model in a message originated by a client device located outside the provider network.

7. The computer-implemented method of claim 6, further comprising optimizing the source ML model to yield the ML model.

8. The computer-implemented method of claim 5, wherein deploying the ML model as the one or more model serving units comprises:
determining a number of the one or more model serving units to be deployed based on at least one of:
predicted throughput characteristics of the one or more model serving units;
database statistics describing data of the database; or
computing resource capabilities of the database.

9. The computer-implemented method of claim 4, wherein determining that the portion of the query indicates that one or more ML inferences are to be performed comprises:
identifying a table name of the query that corresponds to a virtual table associated with the ML model.

10. The computer-implemented method of claim 9, wherein executing the query plan comprises:
sending a request to a service discovery system of the provider network for reachability information of the endpoint that is associated with the table name; and
receiving a response from the service discovery system that includes one or more network addresses or hostnames.

11. The computer-implemented method of claim 4, further comprising:
adding additional model serving units or removing one or more of the one or more model serving units based on an analysis of at least one of:
an amount of resource usage of at least one of the one or more model serving units, the resource usage comprising at least one of processing utilization, memory utilization, or network utilization of the at least one model serving unit;
amounts or types of query activity of the database over a period of time; or
a data profile describing data of the database.

12. The computer-implemented method of claim 4, wherein the query comprises a Structured Query Language (SQL) SELECT query.

13. The computer-implemented method of claim 4, wherein sending the response to the query comprises receiving, at a leader node from the plurality of computing nodes, intermediate query results and coalescing, by the leader node, the intermediate query results.

14. The computer-implemented method of claim 4, wherein executing the query plan comprises:
streaming, by a storage engine layer, data to a model inference engine layer as part of the query plan, causing a plurality of model serving units to operate to generate ML inferences.

15. A system comprising:
a cluster of model serving units implemented by a first one or more electronic devices of a provider network, each of the model serving units to generate machine learning (ML) inferences using a ML model; and
a database instance implemented by a second one or more electronic devices of the provider network, the database instance including instructions that upon execution cause the database instance to:
receive a query;
generate a query plan for the query, comprising determining that a portion of the query indicates that one or more ML inferences are to be performed via the cluster of model serving units;
execute the query plan by one or more nodes of the database instance, the executing including:
executing, by a first computing node of a plurality of computing nodes of the database instance, a first portion of the query plan, the first portion including obtaining, by the first computing node, endpoint information for the ML model run at a first model serving unit of one or more model serving units, the first portion further including the first computing node issuing, via an endpoint, a first inference request to the first model serving unit, and obtaining, via the endpoint, a first one or more inferences generated by the first model serving unit; and
executing, by a second computing node of the plurality of computing nodes, a second portion of the query plan, the second portion including obtaining, by the second computing node, endpoint information for the ML model run at a second model serving unit of the one or more model serving units, the second portion further including the second computing node issuing, via the endpoint, a second inference request to the second model serving unit, and obtaining, via the endpoint, a second one or more inferences generated by the second model serving unit; and send a response to the query, the response including or being based on the first and second one or more inferences.

16. The system of claim 15, further comprising a database service, the database service including the database instance and including instructions that upon execution cause the database service to:

obtain the ML model;

deploy the ML model as the cluster of model serving units; and configure an endpoint to be associated with the cluster.

17. The system of claim 16, wherein to obtain the ML model, the database service is to:

obtain a source ML model from a storage location of a storage service of the provider network;

obtain the source ML model from a ML service of the provider network that trained the source ML model; or receive the source ML model in a message originated by a client device located outside the provider network.

18. The system of claim 17, wherein the database service is further to optimize the source ML model to yield the ML model.

19. The system of claim 16, wherein to deploy the ML model as the cluster of model serving units the database service is to:

determine a number of model serving units of the cluster to be deployed based on at least one of:

database statistics describing data or usage of the database instance, the database statistics comprising one or more of user statistics, a data profile of the data, or query statistics; or computing resource capabilities of the database instance.

20. The system of claim 15, wherein determining that the portion of the query indicates that one or more ML inferences are to be performed comprises:

identifying a table name of the query that corresponds to a virtual table associated with the ML model.

* * * * *